US012323762B2

(12) United States Patent
Tammi et al.

(10) Patent No.: US 12,323,762 B2
(45) Date of Patent: Jun. 3, 2025

(54) SPATIAL AUDIO CAPTURE

(71) Applicant: Nokia Technologies Oy, Espoo (FI)

(72) Inventors: Mikko Tapio Tammi, Tampere (FI); Toni Henrik Makinen, Pirkkala (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 192 days.

(21) Appl. No.: 17/958,591

(22) Filed: Oct. 3, 2022

(65) Prior Publication Data

US 2023/0104933 A1 Apr. 6, 2023

(30) Foreign Application Priority Data

Oct. 4, 2021 (GB) .................................... 2114186

(51) Int. Cl.
*H04R 1/40* (2006.01)

(52) U.S. Cl.
CPC .................................. *H04R 1/406* (2013.01)

(58) Field of Classification Search
CPC ... H04R 1/406; H04S 7/30; H04S 3/00; H04S 7/302; H04S 7/305; H04S 2400/15
See application file for complete search history.

(56) References Cited

U.S. PATENT DOCUMENTS

| | | | | |
|---|---|---|---|---|
| 8,155,346 | B2 * | 4/2012 | Yoshizawa | G01S 3/8083 381/92 |
| 9,439,019 | B2 * | 9/2016 | Chen | H04W 88/02 |
| 9,622,004 | B2 * | 4/2017 | Matsumoto | H04R 1/406 |
| 9,838,805 | B2 * | 12/2017 | Gran | H04R 25/70 |
| 10,431,211 | B2 * | 10/2019 | Kim | G10L 15/20 |
| 10,645,518 | B2 * | 5/2020 | Eronen | H04S 5/00 |
| 11,373,662 | B2 * | 6/2022 | Tracey | G10L 19/008 |
| 11,785,408 | B2 * | 10/2023 | Laitinen | G10L 25/21 381/23 |
| 2007/0076901 | A1 * | 4/2007 | Fischer | H04R 25/407 381/91 |
| 2015/0379992 | A1 * | 12/2015 | Lee | G10L 15/22 704/275 |
| 2016/0307554 | A1 * | 10/2016 | Tsai | G10L 21/0208 |
| 2019/0132674 | A1 * | 5/2019 | Vilkamo | G10L 25/18 |
| 2021/0076130 | A1 * | 3/2021 | Laitinen | H04R 1/406 |
| 2021/0263125 | A1 | 8/2021 | Arai et al. | 3/808 |

FOREIGN PATENT DOCUMENTS

| | | | |
|---|---|---|---|
| EP | 3232219 | A | 10/2017 |
| GB | 2590651 | A | 7/2021 |
| JP | 2017-097101 | A | 6/2017 |
| JP | 2017-151076 | A | 8/2017 |
| WO | WO-2020/003342 | A1 | 1/2020 |
| WO | WO 2021/053266 | A2 | 3/2021 |

* cited by examiner

*Primary Examiner* — Akelaw Teshale
(74) *Attorney, Agent, or Firm* — McCarter & English, LLP

(57) ABSTRACT

An apparatus including circuitry configured to: obtain two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and determine, in the one or more frequency band of the two or more audio signals, at least a second sound source direction parameter at least based on at least in part the one or more modified audio signal.

20 Claims, 14 Drawing Sheets

SPATIAL AUDIO CAPTURE

FIELD

The present application relates to apparatus and methods for spatial audio capture, and specifically for determining directions of arrival and energy based ratios for two or more identified source sources within a sound field captured by the spatial audio capture.

BACKGROUND

Spatial audio capture with microphone arrays is utilized in many modern digital devices such as mobile devices and cameras, in many cases together with video capture. Spatial audio capture can be played back with headphones or loudspeakers to provide the user with an experience of the audio scene captured by the microphone arrays.

Parametric spatial audio capture methods enable spatial audio capture with diverse microphone configurations and arrangements, thus can be employed in consumer devices, such as mobile phones. Parametric spatial audio capture methods are based on signal processing solutions for analysing the spatial audio field around the device utilizing available information from multiple microphones. Typically, these methods perceptually analyse the microphone audio signals to determine relevant information in frequency bands. This information includes for example direction of a dominant sound source (or audio source or audio object) and a relation of a source energy to overall band energy. Based on this determined information the spatial audio can be reproduced, for example using headphones or loudspeakers. Ultimately the user or listener can thus experience the environment audio as if they were present in the audio scene within which the capture devices were recording.

The better the audio analysis and synthesis performance the more realistic is the outcome experienced by the user or listener.

SUMMARY

There is provided according to a first aspect an apparatus comprising means configured to: obtain two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and determine, in the one or more frequency band of the two or more audio signals, at least a second sound source direction parameter at least based on at least in part the one or more modified audio signal.

The means configured to provide one or more modified audio signal based on the two or more audio signals may be further configured to: generate a modified two or more audio signals based on modifying the two or more audio signals with a projection of a first sound source defined by the first sound source direction parameter; and the means configured to determine, in the one or more frequency band of the two or more audio signals, at least a second sound source direction parameter at least based on at least in part the one or more modified audio signal is configured to determine in the one or more frequency band of the two or more audio signals, the at least a second sound source direction parameter by processing the modified two or more audio signals.

The means may be further configured to: determine, in one or more frequency band of the two or more audio signals, a first sound source energy parameter based on the processing of the two or more audio signals; and determine, at least a second sound source energy parameter at least based on at least in part on the one or more modified audio signal and the first sound source energy parameter.

The first and second sound source energy parameter may be a direct-to-total energy ratio and wherein the means is configured to determine at least a second sound source energy parameter at least based on at least in part on the one or more modified audio signal is configured to: determine an interim second sound source energy parameter direct-to-total energy ratio based on an analysis of the one or more modified audio signal; and generate the second sound source energy parameter direct-to-total energy ratio based on one of: selecting the smallest of: the interim second sound source energy parameter direct-to-total energy ratio or a value of the first sound source energy parameter direct-to-total energy ratio subtracted from a value of one; or multiplying the interim second sound source energy parameter direct-to-total energy ratio with a value of the first sound source energy parameter direct-to-total energy ratio subtracted from a value of one.

The means configured to determine the at least second sound source energy parameter at least based on at least in part on the one or more modified audio signal and the first sound source energy parameter may be further configured to determine, the at least second sound source energy parameter further based on the first sound source direction parameter, such that the second sound source energy parameter is scaled relative to the difference between the first sound source direction parameter and second sound source direction parameter.

The means configured to determine, in one or more frequency band of the two or more audio signals, a first sound source direction parameter based on processing of the two or more audio signals may be configured to: select a first pair of the two or microphones; select a first pair of respective audio signals from the selected pair of the two or more microphones; determine a delay which maximises a correlation between the first pair of respective audio signals from the selected pair of the two or more microphones; and determine a pair of directions associated with the delay which maximises the correlation between the first pair of respective audio signals from the selected pair of the two or more microphones, the first sound source direction parameter being selected from the pair of determined directions.

The means configured to determine, in one or more frequency band of the two or more audio signals, a first sound source direction parameter based on processing of the two or more audio signals may be configured to select the first sound source direction parameter from the pair of determined directions based on a further determination of a further delay which maximises a further correlation between a further pair of respective audio signals from a selected further pair of the two or more microphones.

The means configured to determine, in one or more frequency band of the two or more audio signals, the first sound source energy parameter based on the processing of the two or more audio signals may be configured to determine the first sound source energy ratio corresponding to the first sound source direction parameter by normalising a maximised correlation relative to an energy of the first pair of respective audio signals for the frequency band.

The means configured to provide one or more modified audio signal based on the two or more audio signals may be configured to: determine a delay between a first pair of respective audio signals based on the determined first sound source direction parameter; align the first pair of respective audio signals based on an application of the determined delay to one of the first pair of respective audio signals; identify a common component from each of the first pair of respective audio signals; subtract the common component from each of the first pair of respective audio signals; and restore the delay to the subtracted component one of the respective audio signals to generate one or more modified audio signal.

The means configured to provide one or more modified audio signal based on the two or more audio signals may be configured to: determine a delay between a first pair of respective audio signals based on the determined first sound source direction parameter; align the first pair of respective audio signals based on an application of the determined delay to one of the first pair of respective audio signals; identify a common component from each of the first pair of respective audio signals; subtract a modified common component, the modified common component being the common component multiplied with a gain value associated with a microphone associated with the pair of microphones, from each of the first pair of respective audio signals; and restore the delay to the subtracted gain multiplied component one of the respective audio signals to generate the modified two or more audio signals.

The means configured to provide one or more modified audio signal based on the two or more audio signals may be configured to: determine a delay between a first pair of respective audio signals based on the determined first sound source direction parameter, the respective audio signals from a selected first pair of the two or more microphones; align the first pair of respective audio signals based on an application of the determined delay to one of the first pair of respective audio signals; select an additional pair of respective audio signals from a selected additional pair of the two or more microphones; determine an additional delay between the additional pair of respective audio signals based on a determined additional sound source direction parameter; align the additional pair of respective audio signals based on an application of the determined additional delay to one of the additional pair of respective audio signals; identify a common component from the first and second pair of respective audio signals; subtract the common component or a modified common component, the modified common component being the common component multiplied with a gain value associated with a microphone associated with the first pair of microphones, from each of the first pair of respective audio signals; and restore the delay to the subtracted gain multiplied component one of the respective audio signals to generate the modified two or more audio signals.

The means configured to obtain two or more audio signals from respective two or more microphones may be further configured to: select a first pair of the two or more microphones to obtain the two or more audio signals and select a second pair of the two or more microphones to obtain a second pair of two or more audio signals, wherein the second pair of the two or more microphones are in an audio shadow with respect to the first sound source direction parameter, and wherein the means configured provide one or more modified audio signal based on the two or more audio signals is configured to provide the second pair of two or more audio signals from which the means is configured to determine, in the one or more frequency band of the two or more audio signals, at least a second sound source direction parameter at least based on at least in part the one or more modified audio signal.

The one or more frequency band may be lower than a threshold frequency.

According to a second aspect there is provided a method for an apparatus, the method comprising: obtaining two or more audio signals from respective two or more microphones; determining, in one or more frequency band of the two or more audio signals, a first sound source direction parameter based on processing of the two or more audio signals, wherein processing of the two or more audio signals is further configured to provide one or more modified audio signal based on the two or more audio signals; and determining, in the one or more frequency band of the two or more audio signals, at least a second sound source direction parameter at least based on at least in part the one or more modified audio signal.

Providing one or more modified audio signal based on the two or more audio signals may further comprise: generating a modified two or more audio signals based on modifying the two or more audio signals with a projection of a first sound source defined by the first sound source direction parameter; and determining, in the one or more frequency band of the two or more audio signals, at least a second sound source direction parameter at least based on at least in part the one or more modified audio signal may comprise determining in the one or more frequency band of the two or more audio signals, the at least a second sound source direction parameter by processing the modified two or more audio signals.

The method may further comprise: determining, in one or more frequency band of the two or more audio signals, a first sound source energy parameter based on the processing of the two or more audio signals; and determining, at least a second sound source energy parameter at least based on at least in part on the one or more modified audio signal and the first sound source energy parameter.

The first and second sound source energy parameter may be a direct-to-total energy ratio and wherein determining at least a second sound source energy parameter at least based on at least in part on the one or more modified audio signal may comprise: determining an interim second sound source energy parameter direct-to-total energy ratio based on an analysis of the one or more modified audio signal; and generating the second sound source energy parameter direct-to-total energy ratio based on one of: selecting the smallest of: the interim second sound source energy parameter direct-to-total energy ratio or a value of the first sound source energy parameter direct-to-total energy ratio subtracted from a value of one; or multiplying the interim second sound source energy parameter direct-to-total energy ratio with a value of the first sound source energy parameter direct-to-total energy ratio subtracted from a value of one.

Determining the at least second sound source energy parameter at least based on at least in part on the one or more modified audio signal and the first sound source energy parameter may further comprise determining, the at least second sound source energy parameter further based on the first sound source direction parameter, such that the second sound source energy parameter is scaled relative to the difference between the first sound source direction parameter and second sound source direction parameter.

Determining, in one or more frequency band of the two or more audio signals, a first sound source direction parameter based on processing of the two or more audio signals may comprise: selecting a first pair of the two or microphones;

selecting a first pair of respective audio signals from the selected pair of the two or more microphones; determining a delay which maximises a correlation between the first pair of respective audio signals from the selected pair of the two or more microphones; and determining a pair of directions associated with the delay which maximises the correlation between the first pair of respective audio signals from the selected pair of the two or more microphones, the first sound source direction parameter being selected from the pair of determined directions.

Determining, in one or more frequency band of the two or more audio signals, a first sound source direction parameter based on processing of the two or more audio signals may comprise selecting the first sound source direction parameter from the pair of determined directions based on a further determination of a further delay which maximises a further correlation between a further pair of respective audio signals from a selected further pair of the two or more microphones.

Determining, in one or more frequency band of the two or more audio signals, the first sound source energy parameter based on the processing of the two or more audio signals may comprise determining the first sound source energy ratio corresponding to the first sound source direction parameter by normalising a maximised correlation relative to an energy of the first pair of respective audio signals for the frequency band.

Providing one or more modified audio signal based on the two or more audio signals may comprise: determining a delay between a first pair of respective audio signals based on the determined first sound source direction parameter; aligning the first pair of respective audio signals based on an application of the determined delay to one of the first pair of respective audio signals; identifying a common component from each of the first pair of respective audio signals; subtracting the common component from each of the first pair of respective audio signals; and restoring the delay to the subtracted component one of the respective audio signals to generate one or more modified audio signal.

Providing one or more modified audio signal based on the two or more audio signals may comprise: determining a delay between a first pair of respective audio signals based on the determined first sound source direction parameter; aligning the first pair of respective audio signals based on an application of the determined delay to one of the first pair of respective audio signals; identifying a common component from each of the first pair of respective audio signals; subtracting a modified common component, the modified common component being the common component multiplied with a gain value associated with a microphone associated with the pair of microphones, from each of the first pair of respective audio signals; restoring the delay to the subtracted gain multiplied component one of the respective audio signals to generate the modified two or more audio signals.

Providing one or more modified audio signal based on the two or more audio signals may comprise: determining a delay between a first pair of respective audio signals based on the determined first sound source direction parameter, the respective audio signals from a selected first pair of the two or more microphones; aligning the first pair of respective audio signals based on an application of the determined delay to one of the first pair of respective audio signals; selecting an additional pair of respective audio signals from a selected additional pair of the two or more microphones; determining an additional delay between the additional pair of respective audio signals based on a determined additional sound source direction parameter; aligning the additional pair of respective audio signals based on an application of the determined additional delay to one of the additional pair of respective audio signals; identifying a common component from the first and second pair of respective audio signals; subtracting the common component or a modified common component, the modified common component being the common component multiplied with a gain value associated with a microphone associated with the first pair of microphones, from each of the first pair of respective audio signals; and restoring the delay to the subtracted gain multiplied component one of the respective audio signals to generate the modified two or more audio signals.

Obtaining two or more audio signals from respective two or more microphones comprises: selecting a first pair of the two or more microphones to obtain the two or more audio signals and select a second pair of the two or more microphones to obtain a second pair of two or more audio signals, wherein the second pair of the two or more microphones are in an audio shadow with respect to the first sound source direction parameter, and wherein providing one or more modified audio signal based on the two or more audio signals comprises providing the second pair of two or more audio signals from which the determining, in the one or more frequency band of the two or more audio signals, at least a second sound source direction parameter at least based on at least in part the one or more modified audio signal.

The one or more frequency band may be lower than a threshold frequency.

According to a third aspect there is provided an apparatus comprising at least one processor and at least one memory including a computer program code, the at least one memory and the computer program code configured to, with the at least one processor, cause the apparatus at least to: obtain two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and determine, in the one or more frequency band of the two or more audio signals, at least a second sound source direction parameter at least based on at least in part the one or more modified audio signal.

The apparatus caused to provide one or more modified audio signal based on the two or more audio signals may be further caused to: generate a modified two or more audio signals based on modifying the two or more audio signals with a projection of a first sound source defined by the first sound source direction parameter; and the apparatus caused to determine, in the one or more frequency band of the two or more audio signals, at least a second sound source direction parameter at least based on at least in part the one or more modified audio signal may be caused to determine in the one or more frequency band of the two or more audio signals, the at least a second sound source direction parameter by processing the modified two or more audio signals.

The apparatus may be further caused to: determine, in one or more frequency band of the two or more audio signals, a first sound source energy parameter based on the processing of the two or more audio signals; and determine, at least a second sound source energy parameter at least based on at least in part on the one or more modified audio signal and the first sound source energy parameter.

The first and second sound source energy parameter may be a direct-to-total energy ratio and wherein the apparatus caused to determine at least a second sound source energy parameter at least based on at least in part on the one or more modified audio signal may be caused to: determine an interim second sound source energy parameter direct-to-total energy ratio based on an analysis of the one or more modified audio signal; and generate the second sound source energy parameter direct-to-total energy ratio based on one of: selecting the smallest of: the interim second sound source energy parameter direct-to-total energy ratio or a value of the first sound source energy parameter direct-to-total energy ratio subtracted from a value of one; or multiplying the interim second sound source energy parameter direct-to-total energy ratio with a value of the first sound source energy parameter direct-to-total energy ratio subtracted from a value of one.

The apparatus caused to determine the at least second sound source energy parameter at least based on at least in part on the one or more modified audio signal and the first sound source energy parameter may be further caused to determine, the at least second sound source energy parameter further based on the first sound source direction parameter, such that the second sound source energy parameter is scaled relative to the difference between the first sound source direction parameter and second sound source direction parameter.

The apparatus caused to determine, in one or more frequency band of the two or more audio signals, a first sound source direction parameter based on processing of the two or more audio signals may be caused to: select a first pair of the two or microphones; select a first pair of respective audio signals from the selected pair of the two or more microphones; determine a delay which maximises a correlation between the first pair of respective audio signals from the selected pair of the two or more microphones; and determine a pair of directions associated with the delay which maximises the correlation between the first pair of respective audio signals from the selected pair of the two or more microphones, the first sound source direction parameter being selected from the pair of determined directions.

The apparatus caused to determine, in one or more frequency band of the two or more audio signals, a first sound source direction parameter based on processing of the two or more audio signals may be caused to select the first sound source direction parameter from the pair of determined directions based on a further determination of a further delay which maximises a further correlation between a further pair of respective audio signals from a selected further pair of the two or more microphones.

The apparatus caused to determine, in one or more frequency band of the two or more audio signals, the first sound source energy parameter based on the processing of the two or more audio signals may be caused to determine the first sound source energy ratio corresponding to the first sound source direction parameter by normalising a maximised correlation relative to an energy of the first pair of respective audio signals for the frequency band.

The apparatus caused to provide one or more modified audio signal based on the two or more audio signals may be caused to: determine a delay between a first pair of respective audio signals based on the determined first sound source direction parameter; align the first pair of respective audio signals based on an application of the determined delay to one of the first pair of respective audio signals; identify a common component from each of the first pair of respective audio signals; subtract the common component from each of the first pair of respective audio signals; and restore the delay to the subtracted component one of the respective audio signals to generate one or more modified audio signal.

The apparatus caused to provide one or more modified audio signal based on the two or more audio signals may be caused to: determine a delay between a first pair of respective audio signals based on the determined first sound source direction parameter; align the first pair of respective audio signals based on an application of the determined delay to one of the first pair of respective audio signals; identify a common component from each of the first pair of respective audio signals; subtract a modified common component, the modified common component being the common component multiplied with a gain value associated with a microphone associated with the pair of microphones, from each of the first pair of respective audio signals; and restore the delay to the subtracted gain multiplied component one of the respective audio signals to generate the modified two or more audio signals.

The apparatus caused to provide one or more modified audio signal based on the two or more audio signals may be caused to: determine a delay between a first pair of respective audio signals based on the determined first sound source direction parameter, the respective audio signals from a selected first pair of the two or more microphones; align the first pair of respective audio signals based on an application of the determined delay to one of the first pair of respective audio signals; select an additional pair of respective audio signals from a selected additional pair of the two or more microphones; determine an additional delay between the additional pair of respective audio signals based on a determined additional sound source direction parameter; align the additional pair of respective audio signals based on an application of the determined additional delay to one of the additional pair of respective audio signals; identify a common component from the first and second pair of respective audio signals; subtract the common component or a modified common component, the modified common component being the common component multiplied with a gain value associated with a microphone associated with the first pair of microphones, from each of the first pair of respective audio signals; and restore the delay to the subtracted gain multiplied component one of the respective audio signals to generate the modified two or more audio signals.

The apparatus caused to obtain two or more audio signals from respective two or more microphones may be further caused to: select a first pair of the two or more microphones to obtain the two or more audio signals and select a second pair of the two or more microphones to obtain a second pair of two or more audio signals, wherein the second pair of the two or more microphones are in an audio shadow with respect to the first sound source direction parameter, and wherein the apparatus caused to provide one or more modified audio signal based on the two or more audio signals may be caused to provide the second pair of two or more audio signals from which the apparatus is caused to determine, in the one or more frequency band of the two or more audio signals, at least a second sound source direction parameter at least based on at least in part the one or more modified audio signal.

The one or more frequency band may be lower than a threshold frequency.

According to a fourth aspect there is provided an apparatus comprising: means for obtaining two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and means for determining, in the one or more frequency band of the two or more audio signals, at least a second sound source direction parameter at least based on at least in part the one or more modified audio signal.

According to a fifth aspect there is provided a computer program comprising instructions [or a computer readable medium comprising program instructions] for causing an apparatus to perform at least the following: obtain two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and determine, in the one or more frequency band of the two or more audio signals, at least a second sound source direction parameter at least based on at least in part the one or more modified audio signal.

According to a sixth aspect there is provided a non-transitory computer readable medium comprising program instructions for causing an apparatus to perform at least the following: obtain two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and determine, in the one or more frequency band of the two or more audio signals, at least a second sound source direction parameter at least based on at least in part the one or more modified audio signal.

According to a seventh aspect there is provided an apparatus comprising: obtaining circuitry configured to obtain two or more audio signals from respective two or more microphones; determining circuitry configured to determine, in one or more frequency band of the two or more audio signals, a first sound source direction parameter based on processing of the two or more audio signals, wherein processing of the two or more audio signals is further configured to provide one or more modified audio signal based on the two or more audio signals; and means for determining, in the one or more frequency band of the two or more audio signals, at least a second sound source direction parameter at least based on at least in part the one or more modified audio signal.

According to an eighth aspect there is provided a computer readable medium comprising program instructions for causing an apparatus to perform at least the following: obtain two or more audio signals from respective two or more microphones; determine, in one or more frequency band of the two or more audio signals, a first sound source direction parameter based on processing of the two or more audio signals, wherein processing of the two or more audio signals is further configured to provide one or more modified audio signal based on the two or more audio signals; and determine, in the one or more frequency band of the two or more audio signals, at least a second sound source direction parameter at least based on at least in part the one or more modified audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The concept as discussed herein in further detail with respect to the following embodiments is related to the capture of audio scenes.

In the following description the term sound source is used to describe an (artificial or real) defined element within a sound field (or audio scene). The term sound source can also be defined as an audio object or audio source and the terms are interchangeable with respect to the understanding of the implementation of the examples described herein.

The embodiments herein concern parametric audio capture apparatus and methods, such as spatial audio capture (SPAC) techniques. For every time-frequency tile, the apparatus is configured to estimate a direction of a dominant sound source and the relative energies of the direct and ambient components of the sound source are expressed as direct-to-total energy ratios.

The following examples are suitable for devices with challenging microphone arrangements or configurations, such as found within typical mobile devices where the dimensions of the mobile device typically comprise at least one short (or thin) dimension with respect to the other dimensions. In the examples shown herein the captured spatial audio signals are suitable inputs for spatial synthesizers in order to generate spatial audio signals such as binaural format audio signals for headphone listening, or to multichannel signal format audio signals for loudspeaker listening.

In some embodiments these examples can be implemented as part of a spatial capture front-end for an Immersive Voice and Audio Services (IVAS) standard codec by producing IVAS compatible audio signals and metadata.

Typical spatial analysis comprises estimating the dominant sound source direction and the direct-to-total energy ratio for every time-frequency tile. These parameters are motivated by human auditory system, which is in principle based on similar features. However, in some identified situations it is known that such a model does not provide optimal sound quality.

Typically, where there are multiple simultaneous sound sources, or alternatively the sources are almost masked by background noise there estimation of parameters can be problematic. In the first case, the analysed direction of the dominant source can jump between the actual sound source directions, or, depending on how the sound from the sources sum together, analysis may even end up to as an averaged value of the sound source directions. In the second situation, the dominant sound source is sometimes found, sometimes not, depending on the momentary level of the source and the ambience. In addition to variation in the direction value, in both the above cases the estimated energy ratio can be unstable.

In such situations the direction and energy ratio analysis can result in artefacts in the synthesized audio signal. For example, the directions of the sources may sound unstable or inaccurate, and the background audio may become reverberant.

Figure 1:
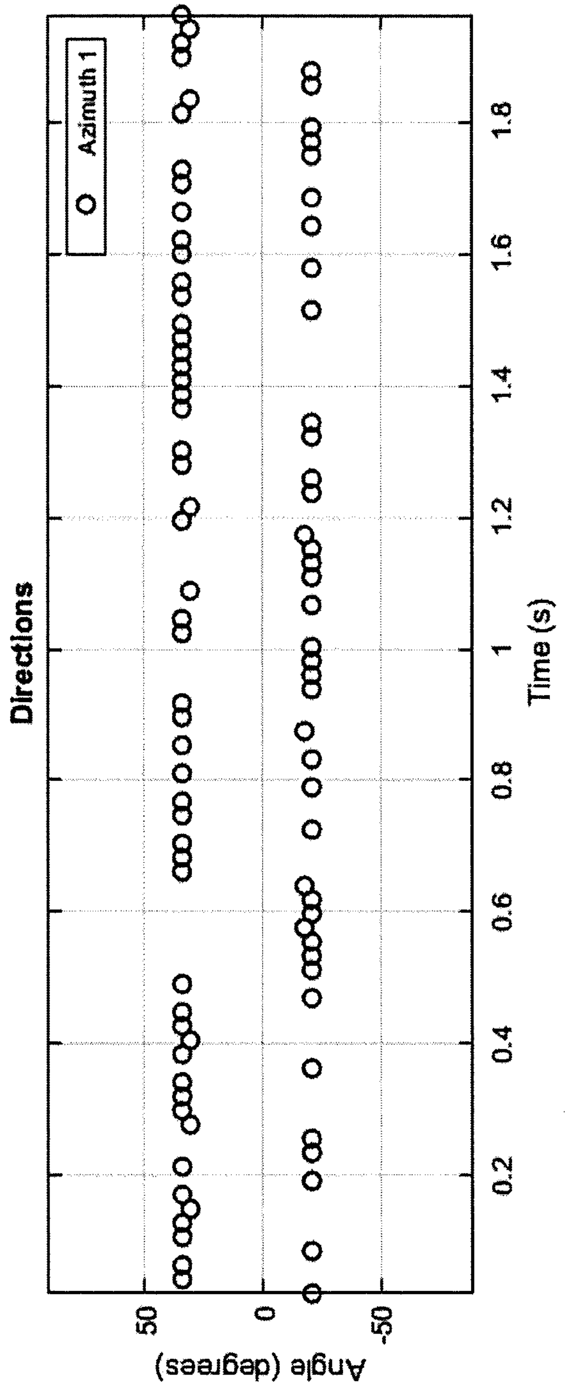
FIG. 1 shows a sound source direction estimation example when there are two equally loud sound sources.

As an example case, as shown in FIG. 1, there is shown the example direction estimates of the dominant sound source where there are two equally loud sound sources located at 30 and −20 degrees azimuth around the capture device. As shown in the FIG. 1, depending on the time instant, either of them can be found to be the dominant sound source, and thus both sources would be synthesized to the estimated direction by the spatial synthesizer. Since the estimated direction jumps continuously between two values the outcome will be vague and would be difficult for the user or listener to detect from which direction the two sources are originating from. In addition, this estimated continuous jumping from one direction to another produces a synthesized sound field which sounds restless and unnatural.

There have been proposed techniques to improve the above-mentioned issues where the amount of information available is increased. For example it has been proposed to estimate parameters for the two most dominant directions for every time-frequency tile. For example, currently developed 3GPP IVAS standard is planned to support two simultaneous directions.

However, for parametric audio coding with typical mobile device microphones setups there are no reliable methods for estimating two dominant source directions. Furthermore where the estimation is not reliable, it is possible that sound sources are synthesized to directions where there actually are no sound sources and/or the sound source positions may continuously jump/move from one location to another in unstable manner. In other words where the estimation is not reliable, there is no benefit of estimating more than one direction and could make the spatial audio signals generated by the spatial synthesizer worse.

Thus in summary the embodiments described herein are related to parametric spatial audio capture with two or more microphones. Furthermore at least) two direction and energy ratio parameters are estimated in every time-frequency tile based on the audio signals from the two or more microphones.

In these embodiments the effect of the first estimated direction is taken into account when estimating the second direction in order to achieve improvements in the multiple sound source direction detection accuracy. This can in some embodiments result in an improvement in the perceptual quality of the synthesized spatial audio.

In practice the embodiments described herein produce estimates of the sounds sources which are perceived to be spatially more stable and more accurate (with respect to their correct or actual positions).

In some embodiments a first direction and energy ratio is estimated (and can be estimated) using any suitable estimation method. Furthermore when estimating the second direction, the effect of the first direction is first removed from the microphone signals. In some embodiments this can be implemented by first removing any delays between the signals based on the first direction and then by subtracting the common component from both signals. Finally, the original delays are restored. The second direction parameters can then be estimated using similar methods as for estimating the first direction.

In some embodiments different microphone pairs are used for estimating two different directions at low frequencies. This emphasizes the natural shadowing of sounds originating from the physical shape of the device and improves possibilities to find sources on the different sides of the device.

In some embodiments the energy ratio of the second direction is first analyzed using methods similar to the estimation of the energy ratio for the first direction. Furthermore in some embodiments the second energy ratio is further modified based on the energy ratio of the first direction and based on the angle difference between the first and the second estimated sound source directions.

Figure 2:
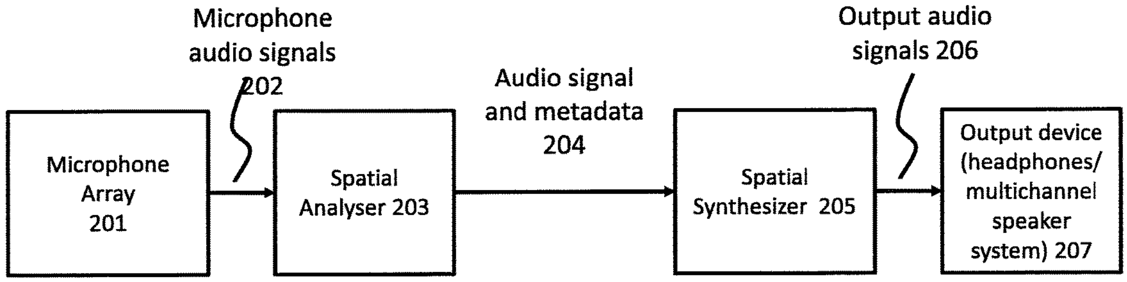
FIG. 2 shows schematically example apparatus suitable for implementing some embodiments.

With respect to FIG. 2 is shown a schematic view of apparatus suitable for implementing the embodiments described herein.

In this example is shown the apparatus comprising a microphone array 201. The microphone array 201 comprises multiple (two or more) microphones configured to capture audio signals. The microphones within the microphone array can be any suitable microphone type, arrangement or configuration. The microphone audio signals 202 generated by the microphone array 201 can be passed to the spatial analyser 203.

The apparatus can comprise a spatial analyser 203 configured to receive or otherwise obtain the microphone audio signals 202 and is configured to spatially analyse the microphone audio signals in order to determine at least two dominant sound or audio sources for each time-frequency block.

The spatial analyser can in some embodiments be a CPU of a mobile device or a computer. The spatial analyser 203 is configured to generate a data stream which includes audio signals as well as metadata of the analyzed spatial information 204.

Depending on the use case, the data stream can be stored or compressed and transmitted to another location.

The apparatus furthermore comprises a spatial synthesizer 205. The spatial synthesizer 205 is configured to obtain the data stream, comprising the audio signals and the metadata. In some embodiments spatial synthesizer 205 is implemented within the same apparatus as the spatial analyser 203 (as shown herein in FIG. 2) but can furthermore in some embodiments be implemented within a different apparatus or device.

The spatial synthesizer 205 can be implemented within a CPU or similar processor. The spatial synthesizer 205 is configured to produce output audio signals 206 based on the audio signals and associated metadata from the data stream 204.

Furthermore depending on the use case, the output signals 206 can be any suitable output format. For example in some embodiments the output format is binaural headphone signals (where the output device presenting the output audio signals is a set of headphones/earbuds or similar) or multichannel loudspeaker audio signals (where the output device is a set of loudspeakers). The output device 207 (which as described above can for example be headphones or loudspeakers) can be configured to receive the output audio signals 206 and present the output to the listener or user.

Figure 3:
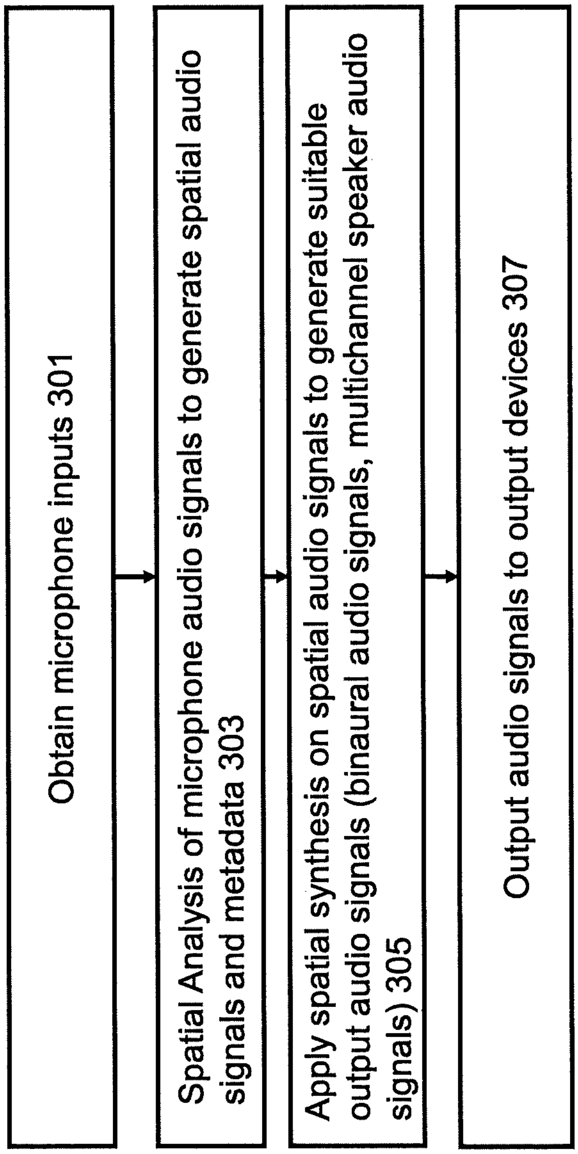
FIG. 3 shows a flow diagram of the operations of the apparatus shown in FIG. 2 according to some embodiments.

These operations of the example apparatus shown in FIG. 2 can be shown by the flow diagram shown in FIG. 3. The operations of the example apparatus can thus be summarized as the following.

Obtaining the microphone audio signals as shown in FIG. 3 by step 301.

Spatially analysing the microphone audio signals to generate spatial audio signals and metadata comprising directions and energy ratios for a first and second audio source for each time-frequency tile as shown in FIG. 3 by step 303.

Applying spatial synthesis to the spatial audio signals to generate suitable output audio signals as shown in FIG. 3 by step 305.

Outputting the output audio signals to the output device as shown in FIG. 3 by step 307.

In some embodiments the spatial analysis can be used in connection with the IVAS codec. In this example the spatial analysis output is a IVAS compatible MASA (metadata-assisted spatial audio) format which can be fed directly into an IVAS encoder. The IVAS encoder generates a IVAS data stream. At the receiving end the IVAS decoder is directly capable of producing the desired output audio format. In other words in such embodiments there is no separate spatial synthesis block.

Figure 4:
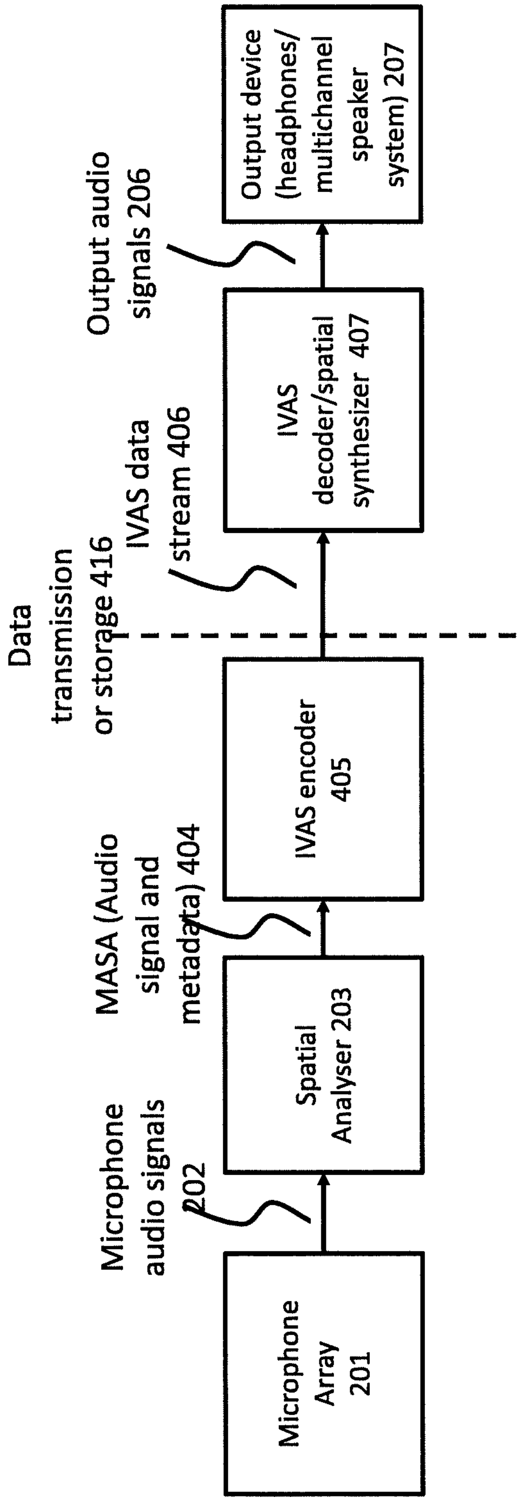
FIG. 4 shows schematically a further example apparatus suitable for implementing some embodiments.
Figure 5:
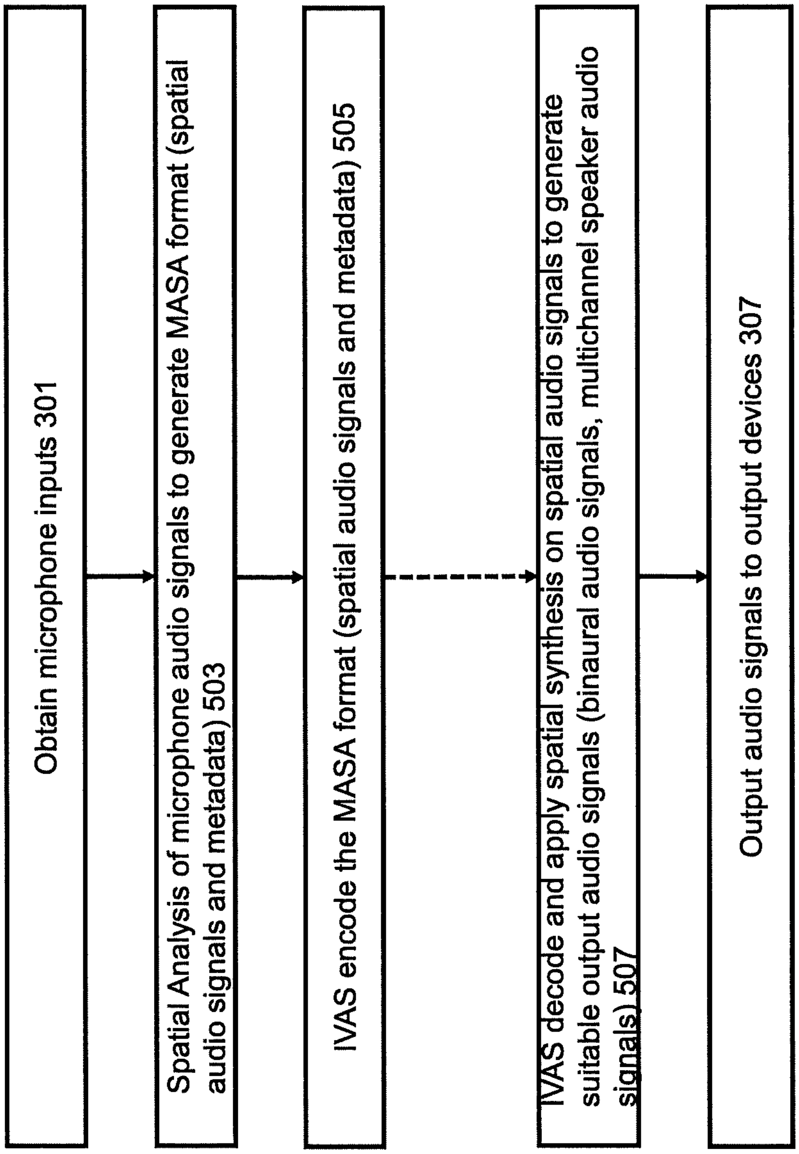
FIG. 5 shows a flow diagram of the operations of the apparatus shown in FIG. 4 according to some embodiments.

This is shown for example with respect to the apparatus shown in FIG. 4 and the operations of the apparatus shown by the flow diagram in FIG. 5.

In this example shown in FIG. 4 the apparatus also comprises a microphone array 201. Configured to generate microphone audio signals 202 which are passed to the spatial analyser 203.

The spatial analyser 203 is configured to receive or otherwise obtain the microphone audio signals 202 and determine at least two dominant sound or audio sources for each time-frequency block. The data stream, a MASA format data stream (which includes audio signals as well as metadata of the analyzed spatial information) 404 generated by the spatial analyser 203 can then be passed to a IVAS encoder 405.

The apparatus can further comprise the IVAS encoder 405 configured to accept the MASA format data stream 404 and generate a IVAS data stream 406 which can be transmitted or stored as shown by the dashed line 416.

The apparatus furthermore comprises a IVAS decoder 407 (spatial synthesizer). The IVAS decoder 407 is configured to decode the IVAS data stream and furthermore spatially synthesize the decided audio signals in order to generate the output audio signals 206 to a suitable output device 207.

The output device 207 (which as described above can for example be headphones or loudspeakers) can be configured to receive the output audio signals 206 and present the output to the listener or user.

These operations of the example apparatus shown in FIG. 4 can be shown by the flow diagram shown in FIG. 5. The operations of the example apparatus can thus be summarized as the following.

Obtaining the microphone audio signals as shown in FIG. 5 by step 301.

Spatially analysing the microphone audio signals to generate a MASA format output (spatial audio signals and metadata comprising directions and energy ratios for a first and second audio source for each time-frequency tile) as shown in FIG. 5 by step 503.

IVAS encoding the generate data stream as shown in FIG. 5 by step 505.

Decoding the encoded IVAS data stream (and applying spatial synthesis to the decoded spatial audio signals) to generate suitable output audio signals as shown in FIG. 5 by step 507.

Outputting the output audio signals to the output device as shown in FIG. 5 by step 307.

In some embodiments, as an alternative, the output audio signals are Ambisonic signals. In such embodiments there may not be immediate direct output device.

Figure 6:
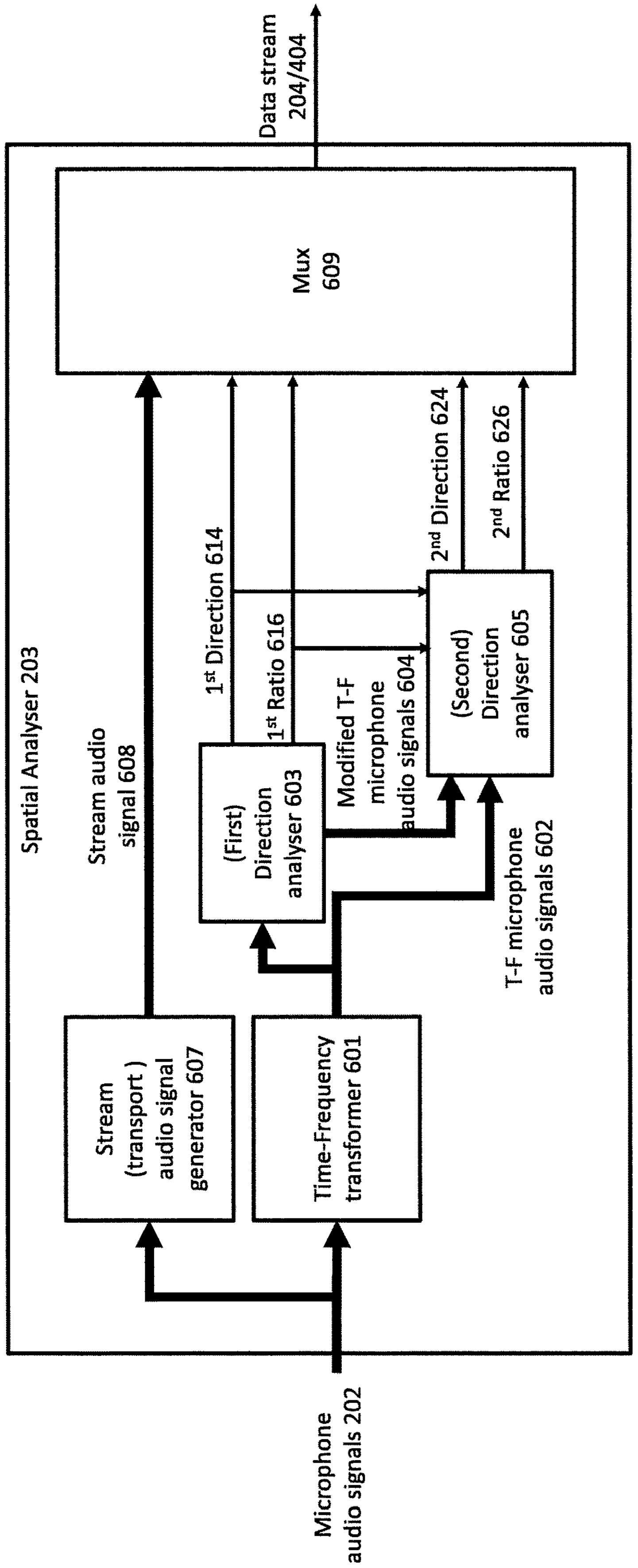
FIG. 6 shows schematically an example spatial analyser as shown in FIG. 2 or 4 according to some embodiments.

The spatial analyser shown in FIGS. 2 and 4 by reference 203 is shown in further detail with respect to FIG. 6.

The spatial analyser 203 in some embodiments comprises a stream (transport) audio signal generator 607. The stream audio signal generator 607 is configured to receive the microphone audio signals 202 and generate a stream audio signal(s) 608 to be passed to a multiplexer 609. The audio stream signal is generated from the input microphone audio signals based on any suitable method. For example, in some embodiments, one or two microphone signals can be selected from the microphone audio signals 202. Alternatively, in some embodiments the microphone audio signals 202 can be downsampled and/or compressed to generate the stream audio signal 608.

In the following example the spatial analysis is performed in the frequency domain, however it would be appreciated that in some embodiments the analysis can also be implemented in the time domain using the time domain sampled versions of the microphone audio signals.

The spatial analyser 203 in some embodiments comprises a time-frequency transformer 601. The time-frequency transformer 601 is configured to receive the microphone audio signals 202 and convert them to the frequency domain. In some embodiments before the transform, the time domain microphone audio signals can be represented as $s_i(t)$, where t is the time index and i is the microphone channel index. The transformation to the frequency domain can be implemented by any suitable time-to-frequency transform, such as STFT (Short-time Fourier transform) or (complex-modulated) QMF (Quadrature mirror filter bank). The resulting time-frequency domain microphone signals 602 are denoted as $S_i(b,n)$, where i is the microphone channel index, b is the frequency bin index, and n is the temporal frame index. The value of b is in range 0, . . . , B−1, where B is the number of bin indexes at every time index n.

The frequency bins can be further combined into subbands k=0, . . . , K−1.

Each subband consists of one or more frequency bins. Each subband k has a lowest bin $b_{k,low}$ and a highest bin $b_{k,high}$. The widths of the subbands are typically selected based on properties of human hearing, for example equivalent rectangular bandwidth (ERB) or Bark scale can be used.

In some embodiments the spatial analyser 203 comprises a first direction analyser 603. The first direction analyser 603 is configured to receive the time-frequency domain microphone audio signals 602 and generate estimates for a first sound source for each time-frequency tile of a (first) $1^{st}$ direction 614 and (first) $1^{st}$ ratio 616.

The first direction analyser 603 is configured to generate the estimates for the first direction based on any suitable method such as SPAC (as described in further detail in U.S. Pat. No. 9,313,599.

In some embodiments for example the most dominant direction for a temporal frame index is estimated by searching a time shift $\tau_k$ that maximizes a correlation between two (microphone audio signal) channels for the subband k. $S_i(b,n)$ can be shifted by r samples as follows:

$$S_{i,\tau}(b, n) = S_{i,\tau}(b, n)e^{-j\frac{2\pi b\tau}{B}}$$

Then find the delay $\tau_k$ for each subband k which maximises the correlation between two microphone channels:

$$c(k, n) = \max_{\tau} \sum_{b=b_{k,low}}^{b_{k,high}} \mathrm{Re}\left(S_{2,\tau}^{*}(b, n)S_1(b, n)\right),\ \tau \in [-D_{max}, D_{max}]$$

In the above equation, the 'optimal' delay is searched between the microphones 1 and 2. Re indicates the real part of the result, and * is the complex conjugate of the signal. The delay search range parameter $D_{max}$ is defined based on the distance between microphones. In other words the value of $\tau_k$ is searched only on the range which is physically possible considering the distance between the microphones and the speed of sound.

The angle of the first direction can then be defined as $$\hat{\theta}_1(k, n) = \pm\cos^{-1}\left(\frac{\tau_k}{D_{max}}\right)$$

As shown, there is still uncertainty of the sign of the angle.

Above, the direction analysis between microphones 1 and 2 was defined. A similar procedure can then be repeated between other microphone pairs as well to resolve the ambiguity (and/or obtain a direction with reference to another axis). In other words the information from other analysis pairs can be utilized to get rid of the sign ambiguity in $\hat{\theta}_1(k,n)$.

Figure 8:
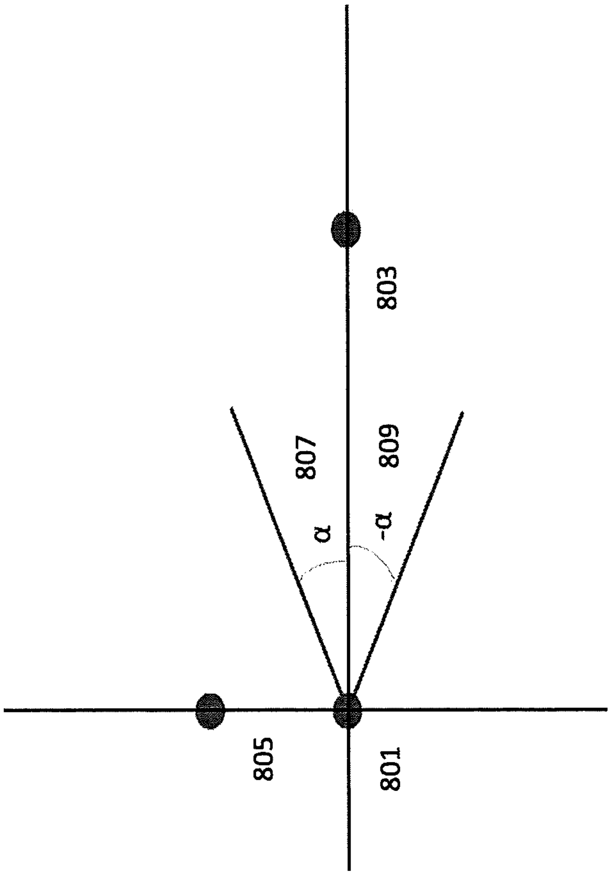
FIG. 8 shows an example situation where direction of arrival of a sound source is estimated using three microphones.

For example FIG. 8 shows an example whereby the microphone array comprises three microphones, a first microphone 801, second microphone 803 and third microphone 805 which are arranged in configuration where there is a first pair of microphones (first microphone 801 and third microphone 803) separated by a distance in a first axis and a second pair of microphones (first microphone 801 and second microphone 805) separated by a distance in a second axis (where in this example the first axis is perpendicular to the second axis). Additionally the three microphones can in this example be on the same third axis which is defined as the one perpendicular to the first and second axis (and perpendicular to the plane of the paper on which the figure is printed). The analysis of delay between the first pair of microphones 801 and 803 results in two alternative angles, α 807 and −α 809. An analysis of the delay between the second pair of microphones 801 and 805 can then be used to determine which of the alternative angles is the correct one. In some embodiments the information required from this analysis is whether the sound arrives first at microphone 801 or 805. If the sound arrives at microphone 805, angle α is correct. If not, −α is selected.

Furthermore based on inference between several microphone pairs the first spatial analyser can determine or estimate the correct direction angle $\hat{\theta}_1(k,n) \rightarrow \theta_1(k,n)$.

In some embodiments where there is a limited microphone configuration or arrangement, for example only two microphones, the ambiguity in the direction cannot be solved. In such embodiments the spatial analyser may be configured to define that all sources are always in front of the device. The situation is the same also when there are more than two microphones, but their locations do not allow for example front-back analysis.

Although not disclosed herein multiple pairs of microphones on perpendicular axes can determine elevation and azimuth estimates.

The first direction analyser 603 can furthermore determine or estimate an energy ratio $r_1(k,n)$ corresponding to angle $\theta_1(k,n)$ using, for example, the correlation value c(k,n) after normalizing it, e.g., by $$r_1(k, n) = \sum\nolimits_{b=b_{k,low}}^{b_{k,high}} Re\left(S_{2,\tau_k}^{*}(b, n)S_1(b, n)\right) / \sum\nolimits_{b=b_{k,low}}^{b_{k,high}} \left(|S_{2,\tau_k}(b, n)||S_1(b, n)|\right)$$

The value of $r_1(k,n)$ is between −1 and 1, and typically it is further limited between 0 and 1.

In some embodiments the first direction analyser 603 is configured to generate modified time-frequency microphone audio signals 604. The modified time-frequency microphone audio signal 604 is one where the first sound source components are removed from the microphone signals.

Thus for example with respect to the first microphone pair (microphones 801 and 803 as shown in the FIG. 8 example microphone configuration). For a subband k the delay which provides the highest correlation is $\tau_k$. For every subband k the second microphone signal is shifted $\tau_k$ samples to obtain a shifted second microphone signal $S_{2,\tau_k}(b,n)$.

An estimate of the sound source component can be determined as an average of these time aligned signals:

$$C(b, n) = \frac{S_1(b, n) + S_{2,\tau_k}(b, n)}{2}$$

In some embodiments any other suitable method for determining the sound source component can be used.

Having determined (for example in the example equation above) an estimate of the sound source component C(b,n) this can then be removed from the microphone audio signals. On the other hand, other simultaneous sound sources are not in phase, which causes that they are attenuated in C(b,n). Now, we can reduce C(b,n) from the (shifted and unshifted) microphone signals $$\hat{S}_1(b,n) = S_1(b,n) - C(b,n) = \frac{S_1(b,n)}{2} - \frac{S_{2,\tau_k}(b,n)}{2}$$

$$\hat{S}_{2,\tau_k}(b,n) = S_{2,\tau_k}(b,n) - C(b,n) = \frac{S_{2,\tau_k}(b,n)}{2} - \frac{S_1(b,n)}{2} = -\hat{S}_1(b,n)$$

Furthermore the shifted modified microphone audio signal $\hat{S}_{2,\tau_k}(b,n)$ is shifted back $\tau_k$ $$\hat{S}_2(b,n) = \hat{S}_{2,\tau_k}(b,n)e^{j\frac{2\pi b\tau_k}{B}}$$

These modified signals $\hat{S}_1(b,n)$ and $\hat{S}_2(b,n)$ can then be passed to the second direction analyser 605.

In some embodiments the spatial analyser 203 comprises a second direction analyser 605. The second direction analyser 605 is configured to receive the time-frequency microphone audio signals 602, the modified time-frequency microphone audio signals 604, the first direction 614 and first ratio 616 estimates and generate second direction 624 and second ratio 626 estimates.

The estimation of the second direction parameter values can employ the same subband structure as for the first direction estimates and follow similar operations as described earlier for the first direction estimates.

Thus it can be possible to estimate the second direction parameters $\theta_2(k,n)$ and $r_2'(k,n)$. In such embodiments the modified time-frequency microphone audio signals 604 $\hat{S}_1(b,n)$ and $\hat{S}_2(b,n)$ are used rather than the time-frequency microphone audio signals 602 $S_1(b,n)$ and $S_2(b,n)$ to determine the direction estimate.

Furthermore in some embodiments the energy ratio $r_2'(k,n)$ is limited though, as the sum of the first and second ratio should not sum to more than one.

In some embodiments the second ratio is limited by $$r_2(k,n)=(1-r_1(k,n))r_2'(k,n)$$

or $$r_2(k,n)=\min(r_2'(k,n),1-r_1(k,n))$$

where function min selects smaller one of the provided alternatives. Both alternative options have been found to provide good quality ratio values.

It is noted that in the above examples as there are several microphone pairs, modified signals have to be calculated separately for each pair, i.e., $\hat{S}_1(b,n)$ is not the same signal when considering microphone pair 801 and 805, or pair 801 and 803.

The first direction estimate 614, first ratio estimate 616, second direction estimate 624, second ratio estimate 626 are passed to the multiplexer (mux) 609 which is configured to generate a data stream 204/404 from combining the estimates and the stream audio signal 608.

Figure 7:
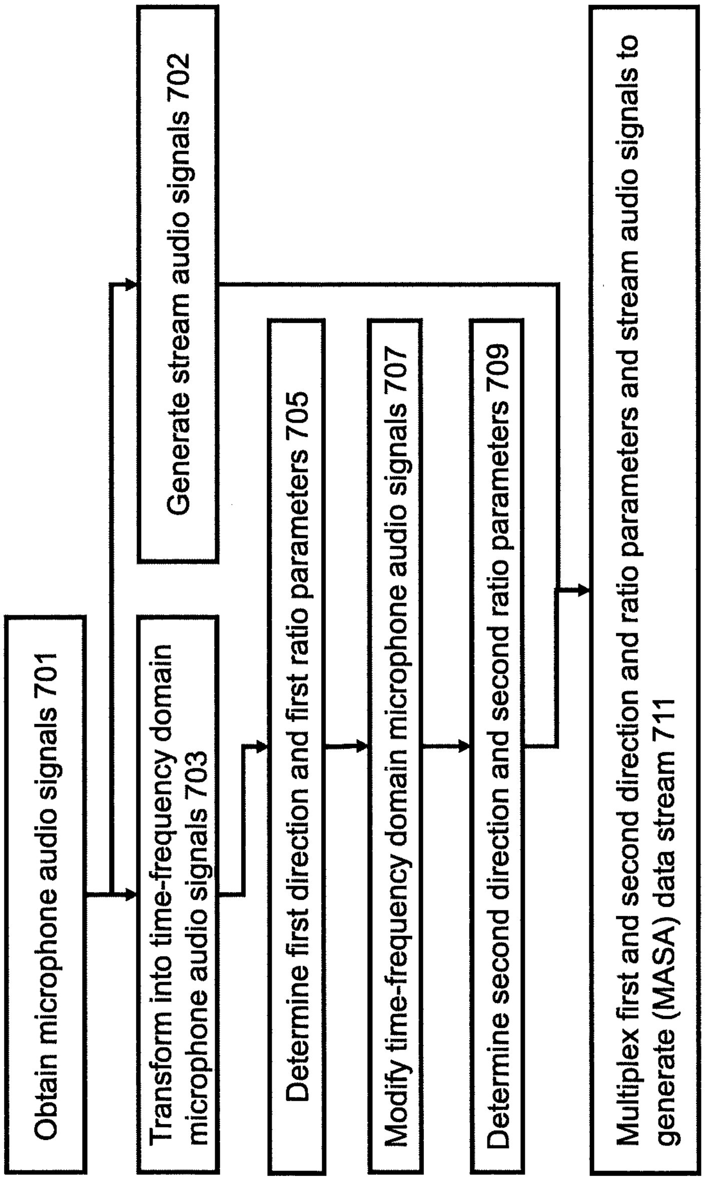
FIG. 7 shows a flow diagram of the operations of the example spatial analyser shown in FIG. 6 according to some embodiments.

With respect to FIG. 7 is shown a flow diagram summarizing the example operations of the spatial analyser shown in FIG. 6.

Microphone audio signals are obtained as shown in FIG. 7 by step 701.

The stream audio signals are then generated from the microphone audio signals as shown in FIG. 7 by step 702.

The microphone audio signals can furthermore be time-frequency domain transformed as shown in FIG. 7 by step 703.

First direction and first ratio parameter estimates can then be determined as shown in FIG. 7 by step 705.

The time-frequency domain microphone audio signals can then be modified (to remove the first source component) as shown in FIG. 7 by step 707.

Then the modified time-frequency domain microphone audio signals are analysed to determine second direction and second ratio parameter estimates as shown in FIG. 7 by step 709.

Then the first direction, first ratio, second direction and second ratio parameter estimates and the stream audio signals are multiplexed to generate a data stream (which can be a MASA format data stream) as shown in FIG. 7 by step 711.

Figure 9:
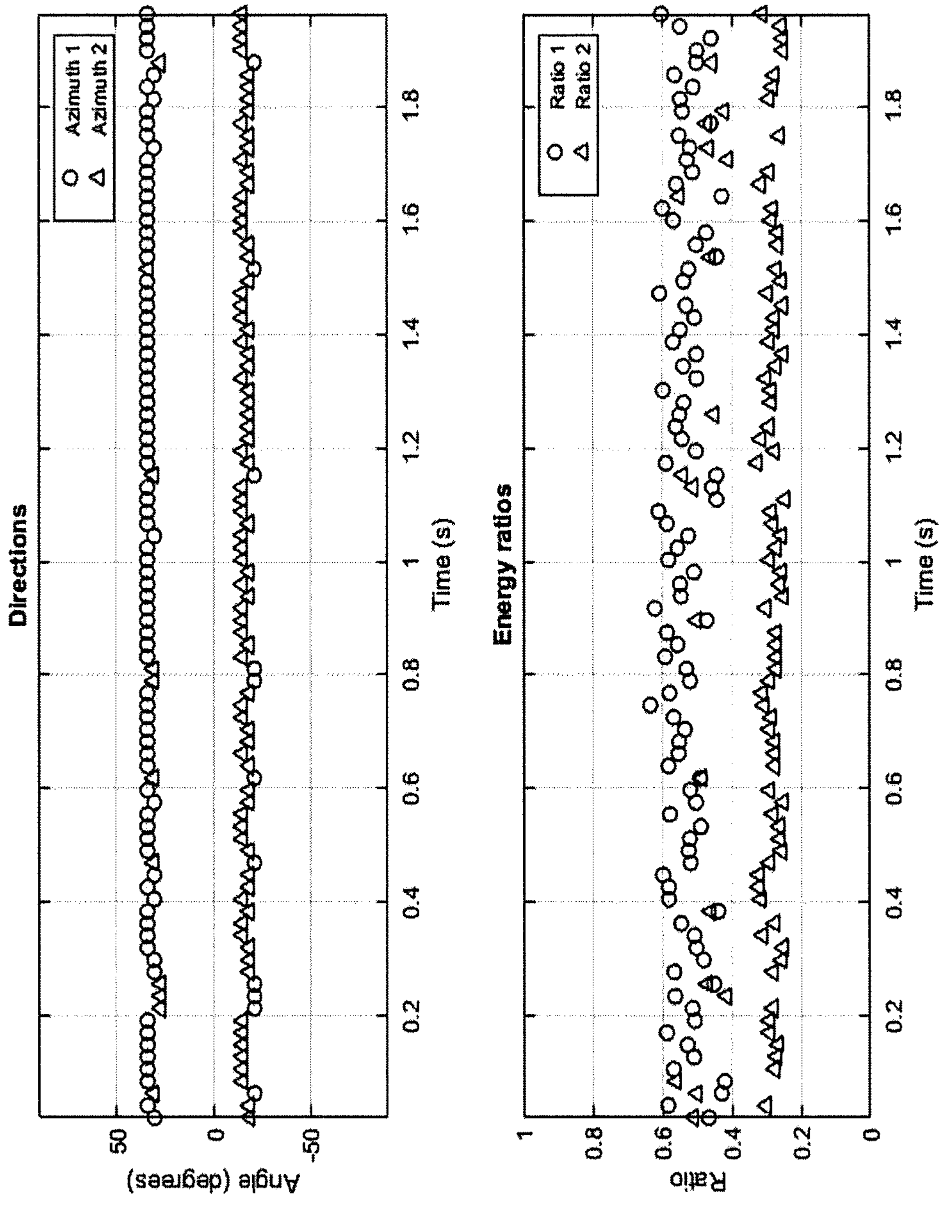
FIG. 9 shows an example set of estimated directions for simultaneous noise input from two directions for one frequency band.

Thus as shown in FIG. 9 there is an example of the direction analysis result for one subband. The input is two uncorrelated noise signals arriving simultaneously from two directions, where the signal arriving from the first direction is 1 dB louder than the second one. Most of time the stronger source is found as the first direction, but occasionally also the second source is found as the first direction. If only one direction was estimated, the direction estimate would thus jump between two values and this might potentially cause quality issues. In case of two direction analysis both sources are included in the first or second direction and the quality of the synthesized signal remains good all the time.

Figure 10:
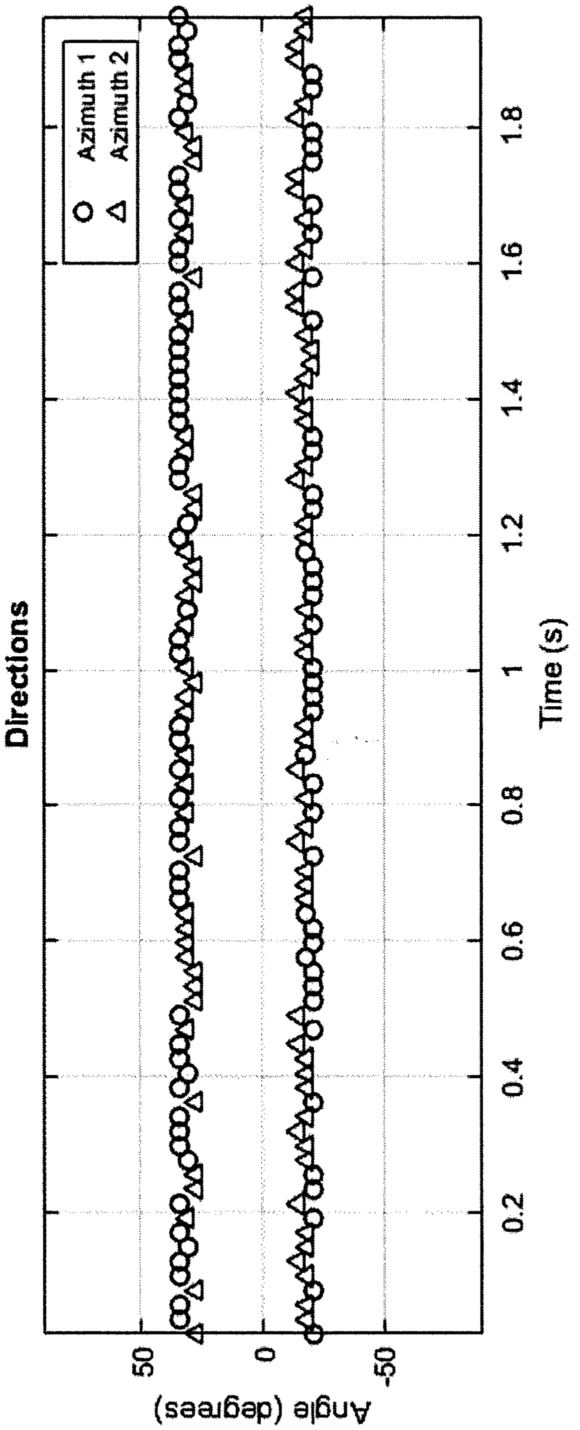
FIG. 10 shows a sound source direction estimation example when there are two equally loud sound sources based on an estimation according to some embodiments.

FIG. 10 for example shows the result of direction estimate in the same situation shown in FIG. 1 (in which only one direction estimate per time-frequency tile was estimated). As a comparison, the same situation with two direction estimates better maintain sound sources in their positions.

In some embodiments other methods may be employed to determine the common component C (b,n) (the first source component). For example in some embodiments principle component analysis (PCA) or other related method can be employed. In some embodiments individual gains for the different channels are applied when generating or subtracting the common component. Thus for example in some embodiments $$C(b,n)=\gamma_1 S_1(b,n)+\gamma_2 S_{2,\tau_k}(b,n)$$

and $$\hat{S}_1(b,n)=S_1(b,n)-g_1 C(b,n)$$

$$\hat{S}_{2,\tau_k}(b,n)=S_{2,\tau_k}(b,n)-g_2 C(b,n)$$

In such embodiments the common component can be removed from the microphone signals while considering, for example, different levels of the audio signals in the microphones.

Furthermore although in the above examples the common component (combined signal) C(b,n) is generated using two microphone signals in some embodiments more microphones can be employed. For example, where there are three microphones available it can be possible to estimate the 'optimal' delay between microphone pairs 801 and 803, and

801 and 805. We denote those as $\tau_k(1,2)$ and $\tau_k(1,3)$, respectively. In such embodiments the combined signal can be obtained as $$C(b, n) = \frac{S_1(b, n) + S_{2,\tau_k(1,2)}(b, n) + S_{3,\tau_k(1,3)}(b, n)}{3}$$

As above, the combined signal can then be removed from all three microphone signals before analysing the second direction.

In the above examples the method for estimating the two directions provides in general good results. However, the microphone locations in a typical mobile device microphone configuration can be used to further improve the estimates, and in some examples improve the reliability of the second direction analysis especially at the lowest frequencies.

Figure 11:
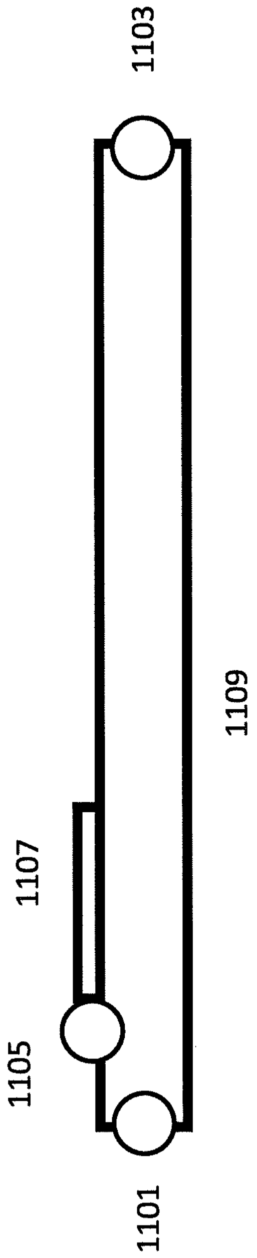
FIG. 11 shows an example microphone arrangement or configuration within an example device when operation in landscape mode.

For example FIG. 11 shows typical microphone configuration locations in modern mobile devices. The device has display 1109 and camera housing 1107. The microphones 1101 and 1105 are located quite close to each other whereas microphone 1103 is located further away. The physical shape of the device affects the audio signals captured by the microphones. Microphone 1105 is on the main camera side of the device. Sounds arriving from the display side of the device must circle around the device edges to reach microphone 1105. Due to this longer path signals are attenuated, and depending on frequency by as much as 6-10 dB. Microphone 1101 on the other hand is on the edge of the device and sounds coming from the left side of the device have direct path to the microphone and sounds coming from the right must travel only around one corner. Thus, even though microphones 1101 and 1105 are close to each other, the signals they capture may be quite different.

The difference between these two microphone signals can be utilized in the direction analysis. Using equations presented above it is possible to estimate the optimal delay $\tau_k(1,2)$ and $\tau_k(3,2)$ between microphones between microphone pairs 1-2 (microphone references 1101 and 1103) and 3-2 (microphone references 1105 and 1103), and it is possible to estimate corresponding angles $\hat{\theta}_{(1,2)}(k,n)$ and $\hat{\theta}_{(3,2)}(k,n)$. As the distance between the microphone pairs is different it must be considered when computing angles.

Especially if $\hat{\theta}_{(1,2)}(k,n)$ and $\hat{\theta}_{(3,2)}(k,n)$ are clearly pointing to a different direction, i.e., they have found a different dominant sound source, it is possible directly utilize these two directions as the two direction estimates $$\hat{\theta}_1(k,n)=\hat{\theta}_{(1,2)}(k,n)$$

$$\hat{\theta}_2(k,n)=\hat{\theta}_{(3,2)}(k,n)$$

The energy ratios can be calculated similarly as presented before, and the value of $r_2(k,n)$ needs to be again limited based on the value of $r_1(k,n)$. The sign ambiguity in the values of $\hat{\theta}_m(k,n)$ can be solved similarly as presented above, in other words the microphone pair 1-3 can be utilized for solving the directional ambiguity.

These embodiments have been found to be useful especially at the lowest frequency bands, where the estimation of two directions is most challenging for typical microphone configurations.

In the above embodiments it has been discussed that the energy ratio $r_2(k,n)$ of the second direction is limited based on the value of the first energy ratio $r_1(k,n)$. In some embodiments the angle differences between the first and second direction estimates are used to modify the ratio(s).

Thus in some embodiments if $\theta_1(k,n)$ and $\theta_2(k,n)$ are pointing to the same direction the energy ratio parameter of the first direction already contains sufficient amount of energy and there is no need to allocate any more energy to given second direction, i.e., $r_2(k,n)$ can be set to zero. In the opposite situation, when $\theta_1(k,n)$ and $\theta_2(k,n)$ are pointing to the opposite directions the impact of ratio $r_2(k,n)$ is most significant and the value of $r_2(k,n)$ should be maximally maintained.

This can be implemented in some embodiments where $\beta(k,n)$ is the absolute angle different between $\theta_1(k,n)$ and $\theta_2(k,n)$:

$$\beta(k,n)=\theta_1(k,n)-\theta_2(k,n)$$

and the value of $\beta(k,n)$ is wrapped between $-\pi$ and $\pi$:

$$\text{If } \beta(k,n)>\pi \quad \beta(k,n)=\beta(k,n)-2\pi$$

$$\text{If } \beta(k,n)<-\pi \quad \beta(k,n)=\beta(k,n)+2\pi$$

Then the overall effect of the first direction to the energy ratio of the second direction can be computed as $$r_2(k, n) = \frac{|\beta(k, n)|}{\pi}(1 - r_1(k, n))r_2'(k, n) \text{ or}$$

$$r_2(k, n) = \frac{|\beta(k, n)|}{\pi}\min(r_2'(k, n), 1 - r_1(k, n))$$

where $r_2'(k,n)$ is the original ratio and $r_2(k,n)$ is the modified ratio. In this example, the angle difference has a linear effect to scaling $r_2(k,n)$. In some embodiments there are other weighting options such as, for example, sinusoidal weighting.

Figure 12:
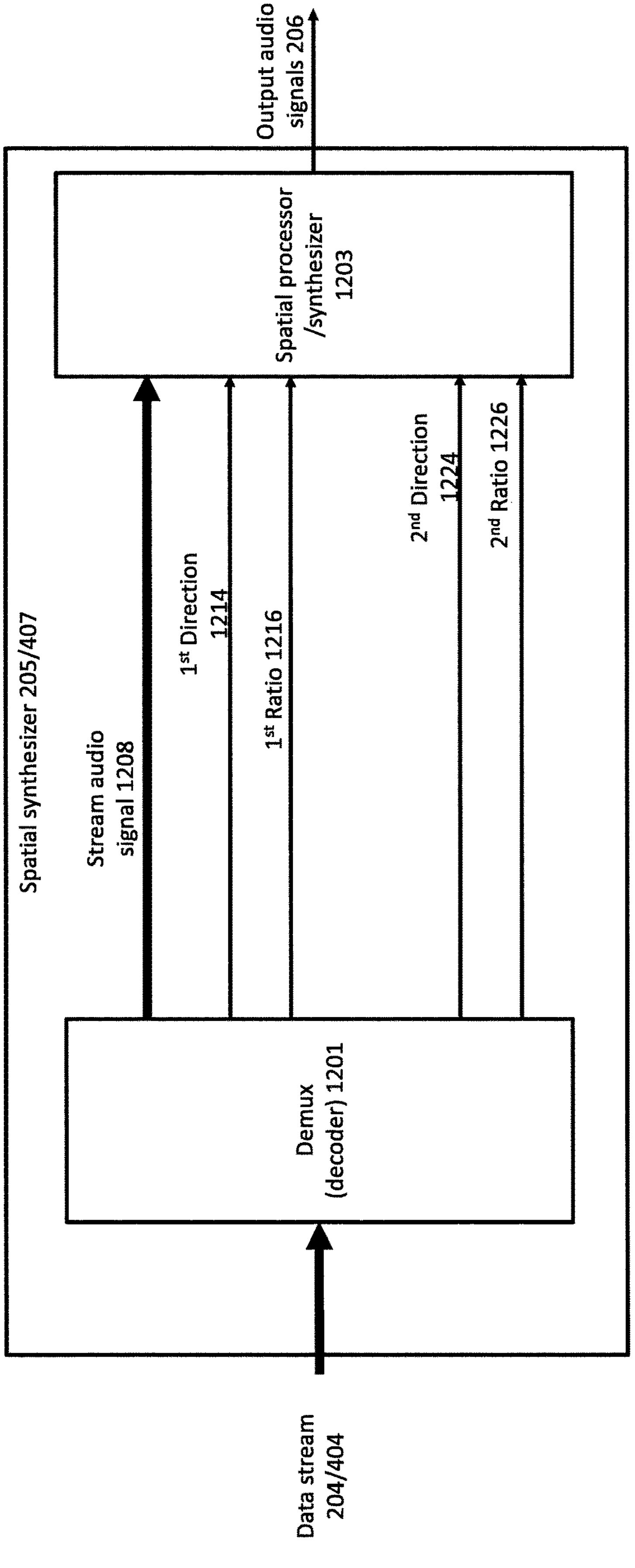
FIG. 12 shows schematically an example spatial synthesizer as shown in FIG. 2 or 4 according to some embodiments.

With respect to FIG. 12 is shown an example spatial synthesizer 205 or IVAS decoder 407 as shown in FIGS. 2 and 4 respectively.

The spatial synthesizer 205/IVAS decoder 407 in some embodiments comprises a demultiplexer 1201. The demultiplexer (Demux) 1201 in some embodiments receives the data stream 204/404 and separates the datastream into stream audio signal 1208 and spatial parameter estimates such as the first direction 1214 estimate, the first ratio 1216 estimate, the second direction 1224 estimate, and the second ratio 1226 estimate. In some embodiments where the data stream was encoded (e.g., using the IVAS encoder), the data stream can be decoded here.

These are then passed to the spatial processor/synthesizer 1203.

The spatial synthesizer 205/IVAS decoder 407 comprises a spatial processor/synthesizer 1203 and is configured to receive the estimates and the stream audio signal and render the output audio signal. The spatial processing/synthesis can be any suitable two direction-based synthesis, such as described in EP3791605.

Figure 13:
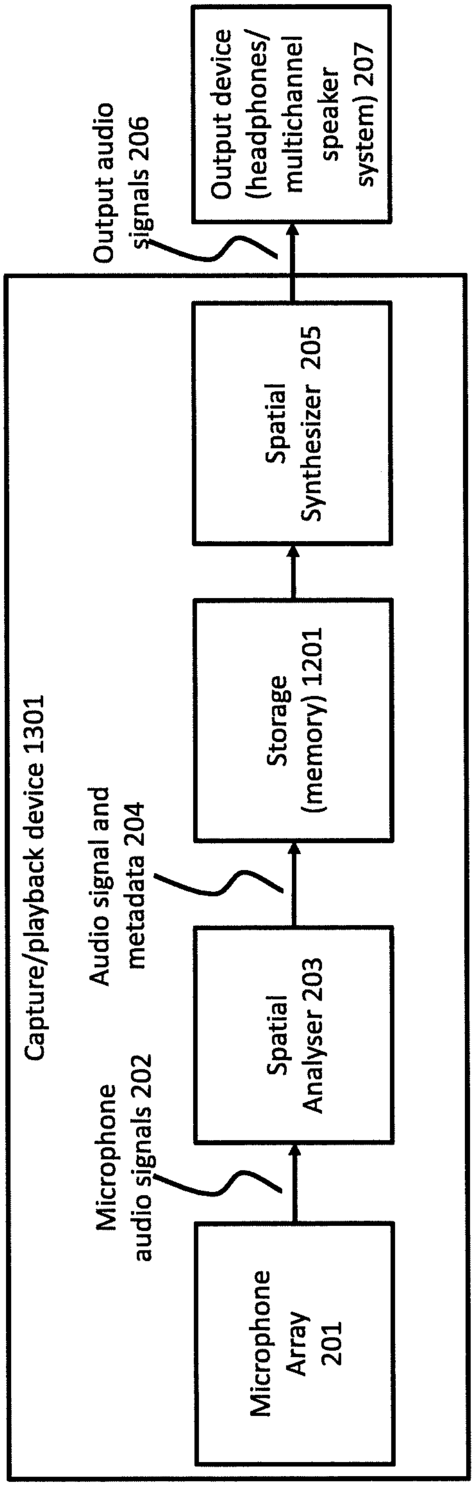
FIG. 13 shows schematically an example apparatus suitable for implementing some embodiments.

FIG. 13 shows a schematic view of an example implementation according to some embodiments. The apparatus is a capture/playback device 1301 which comprises the components of the microphone array 201, the spatial analyser 203, and the spatial synthesizer 205. Furthermore the device 1301 comprises a storage (memory) 1201 configured to store the audio signal and metadata (data stream) 204.

The capture/playback device 1301 can in some embodiments be a mobile device.

Figure 14:
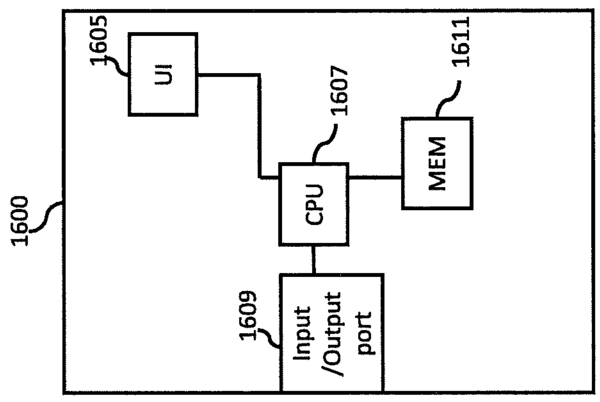
FIG. 14 shows schematically an example device suitable for implementing the apparatus shown.

With respect to FIG. 14 an example electronic device which may be used as the computer, encoder processor, decoder processor or any of the functional blocks described herein is shown. The device may be any suitable electronics device or apparatus. For example in some embodiments the device 1600 is a mobile device, user equipment, tablet computer, computer, audio playback apparatus, etc.

In some embodiments the device 1600 comprises at least one processor or central processing unit 1607. The processor 1607 can be configured to execute various program codes such as the methods such as described herein.

In some embodiments the device 1600 comprises a memory 1611. In some embodiments the at least one processor 1607 is coupled to the memory 1611. The memory 1611 can be any suitable storage means. In some embodiments the memory 1611 comprises a program code section for storing program codes implementable upon the processor 1607. Furthermore in some embodiments the memory 1611 can further comprise a stored data section for storing data, for example data that has been processed or to be processed in accordance with the embodiments as described herein. The implemented program code stored within the program code section and the data stored within the stored data section can be retrieved by the processor 1607 whenever needed via the memory-processor coupling.

In some embodiments the device 1600 comprises a user interface 1605. The user interface 1605 can be coupled in some embodiments to the processor 1607. In some embodiments the processor 1607 can control the operation of the user interface 1605 and receive inputs from the user interface 1605. In some embodiments the user interface 1605 can enable a user to input commands to the device 1600, for example via a keypad. In some embodiments the user interface 1605 can enable the user to obtain information from the device 1600. For example the user interface 1605 may comprise a display configured to display information from the device 1600 to the user. The user interface 1605 can in some embodiments comprise a touch screen or touch interface capable of both enabling information to be entered to the device 1600 and further displaying information to the user of the device 1600.

In some embodiments the device 1600 comprises an input/output port 1609. The input/output port 1609 in some embodiments comprises a transceiver. The transceiver in such embodiments can be coupled to the processor 1607 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1609 may be configured to transmit/receive the audio signals, the bitstream and in some embodiments perform the operations and methods as described above by using the processor 1607 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose-computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus at least to:

obtain two or more audio signals from respective two or more microphones;

determine, in one or more frequency bands of the two or more audio signals, a first sound source direction parameter based on processing of the two or more audio signals, wherein processing of the two or more audio signals is further configured to provide one or more modified audio signals based on the two or more audio signals; and determine, in the one or more frequency bands of the two or more audio signals, at least a second sound source direction parameter at least based on at least in part the one or more modified audio signals.

2. The apparatus as claimed in claim 1, wherein providing the one or more modified audio signals comprises the at least one memory stores instructions that, when executed with the at least one processor, cause the apparatus to:

generate a modified two or more audio signals based on modifying the two or more audio signals with a projection of a first sound source defined with the first sound source direction parameter; and determine in the one or more frequency bands of the two or more audio signals, at least the second sound source direction parameter with processing the modified two or more audio signals.

3. The apparatus as claimed in claim 1, where the at least one memory stores instructions that, when executed with the at least one processor, cause the apparatus to:

determine, in the one or more frequency bands of the two or more audio signals, a first sound source energy parameter based on the processing of the two or more audio signals; and determine at least a second sound source energy parameter at least based on at least in part the one or more modified audio signals and the first sound source energy parameter.

4. The apparatus as claimed in claim 3, wherein the first and second sound source energy parameters comprise direct-to-total energy ratios and wherein the at least one memory stores instructions that, when executed with the at least one processor, cause the apparatus to:

determine an interim second sound source energy parameter direct-to-total energy ratio based on an analysis of the one or more modified audio signals; and generate the second sound source energy parameter direct-to-total energy ratio based on one of:

selection of a smallest of: the interim second sound source energy parameter direct-to-total energy ratio, or a value of the first sound source energy parameter direct-to-total energy ratio subtracted from a value of one; or multiplication of the interim second sound source energy parameter direct-to-total energy ratio with the value of the first sound source energy parameter direct-to-total energy ratio subtracted from the value of one.

5. The apparatus as claimed in claim 3, wherein at least the second sound source energy parameter is determined further based on the first sound source direction parameter, such that the second sound source energy parameter is scaled relative to a difference between the first sound source direction parameter and the second sound source direction parameter.

6. The apparatus as claimed in claim 1, wherein the at least one memory stores instructions that, when executed with the at least one processor, cause the apparatus to:

select a first pair of the two or more microphones;

select a first pair of respective audio signals from the selected first pair of the two or more microphones;

determine a delay which maximises a correlation between the first pair of respective audio signals from the selected first pair of the two or more microphones; and determine a pair of directions associated with the delay which maximises the correlation between the first pair of respective audio signals from the selected first pair of the two or more microphones, the first sound source direction parameter being selected from the pair of determined directions.

7. The apparatus as claimed in claim 6, wherein the at least one memory stores instructions that, when executed with the at least one processor, cause the apparatus to at least one of:

select the first sound source direction parameter from the pair of determined directions based on a further determination of a further delay which maximises a further correlation between a further pair of respective audio signals from a selected further pair of the two or more microphones; or determine a first sound source energy ratio corresponding to the first sound source direction parameter with normalising a maximised correlation relative to an energy of the first pair of respective audio signals for the one or more frequency bands.

8. The apparatus as claimed in claim 1, wherein the at least one memory stores instructions that, when executed with the at least one processor, cause the apparatus to:

determine a delay between a first pair of respective audio signals based on the determined first sound source direction parameter;

align the first pair of respective audio signals based on an application of the determined delay to one of the first pair of respective audio signals;

identify a common component from each of the first pair of respective audio signals;

subtract the common component from each of the first pair of respective audio signals; and restore the delay to a remaining component of one of the respective audio signals to generate the one or more modified audio signals.

9. The apparatus as claimed in claim 1, wherein the at least one memory stores instructions that, when executed with the at least one processor, cause the apparatus to:

determine a delay between a first pair of respective audio signals based on the determined first sound source direction parameter;

align the first pair of respective audio signals based on an application of the determined delay to one of the first pair of respective audio signals;

identify a common component from each of the first pair of respective audio signals;

subtract a modified common component, the modified common component being the common component multiplied with a gain value associated with a microphone associated with the first pair of respective audio signals, from each of the first pair of respective audio signals; and restore the delay to a remaining component of one of the respective audio signals to generate the one or more modified audio signals.

10. The apparatus as claimed in claim 1, wherein the at least one memory stores instructions that, when executed with the at least one processor, cause the apparatus to:

determine a delay between a first pair of respective audio signals based on the determined first sound source direction parameter, the respective audio signals from a selected first pair of the two or more microphones;

align the first pair of respective audio signals based on an application of the determined delay to one of the first pair of respective audio signals;

select an additional pair of respective audio signals from a selected additional pair of the two or more microphones;

determine an additional delay between the additional pair of respective audio signals based on a determined additional sound source direction parameter;

align the additional pair of respective audio signals based on an application of the determined additional delay to one of the additional pair of respective audio signals;

identify a common component from the first and additional pairs of respective audio signals;

subtract the common component or a modified common component, the modified common component being the common component multiplied with a gain value associated with a microphone associated with the first pair of microphones, from each of the first pair of respective audio signals; and restore the delay to a remaining component of one of the first pair of respective audio signals to generate the one or more modified audio signals.

11. The apparatus as claimed in claim 1, wherein the at least one memory stores instructions that, when executed with the at least one processor, cause the apparatus to:

select a first pair of the two or more microphones to obtain the two or more audio signals; and select a second pair of the two or more microphones to obtain a second pair of two or more audio signals, wherein the second pair of the two or more microphones are in an audio shadow with respect to the first sound source direction parameter, wherein providing the one or more modified audio signals comprises the at least one memory stores instructions that, when executed with the at least one processor, cause the apparatus to:

provide the second pair of two or more audio signals based on at least the second sound source direction parameter at least in part associated with the one or more modified audio signals.

12. The apparatus as claimed in claim 11, wherein the one or more frequency bands are lower than a threshold frequency.

13. A method for an apparatus, the method comprising:

obtaining two or more audio signals from respective two or more microphones;

determining, in one or more frequency bands of the two or more audio signals, a first sound source direction parameter based on processing of the two or more audio signals, wherein processing of the two or more audio signals is further configured to provide one or more modified audio signals based on the two or more audio signals; and determining, in the one or more frequency bands of the two or more audio signals, at least a second sound source direction parameter at least based on at least in part the one or more modified audio signals.

14. The method as claimed in claim 13, wherein the providing of the one or more modified audio signals based on the two or more audio signals further comprises:

generating a modified two or more audio signals based on modifying the two or more audio signals with a projection of a first sound source defined with the first sound source direction parameter; and determining, in the one or more frequency bands of the two or more audio signals, at least the second sound source direction parameter with processing the modified two or more audio signals.

15. The method as claimed in claim 13, wherein the method further comprises:

determining, in the one or more frequency bands of the two or more audio signals, a first sound source energy parameter based on the processing of the two or more audio signals; and determining at least a second sound source energy parameter at least based on at least in part the one or more modified audio signals and the first sound source energy parameter.

16. The method as claimed in claim 15, wherein the first and second sound source energy parameters comprise a direct-to-total energy ratios and wherein the determining of at least the second sound source energy parameter at least based on at least in part on the one or more modified audio signals comprises:

determining an interim second sound source energy parameter direct-to-total energy ratio based on an analysis of the one or more modified audio signals; and generating the second sound source energy parameter direct-to-total energy ratio based on one of:

selecting a smallest of: the interim second sound source energy parameter direct-to-total energy ratio or a value of the first sound source energy parameter direct-to-total energy ratio subtracted from a value of one; or multiplying the interim second sound source energy parameter direct-to-total energy ratio with the value of the first sound source energy parameter direct-to-total energy ratio subtracted from the value of one.

17. The method as claimed in claim 15, wherein the determining of at least the second sound source energy parameter at least based on at least in part the one or more modified audio signals and the first sound source energy parameter further comprises:

determining at least the second sound source energy parameter further based on the first sound source direction parameter, such that the second sound source energy parameter is scaled relative to a difference between the first sound source direction parameter and the second sound source direction parameter.

18. The method as claimed in claim 13, wherein the determining, in the one or more frequency bands of the two or more audio signals, of the first sound source direction parameter based on processing of the two or more audio signals comprises:

selecting a first pair of the two or more microphones;

selecting a first pair of respective audio signals from the selected first pair of the two or more microphones;

determining a delay which maximises a correlation between the first pair of respective audio signals from the selected first pair of the two or more microphones; and determining a pair of directions associated with the delay which maximises the correlation between the first pair of respective audio signals from the selected first pair of the two or more microphones, the first sound source direction parameter being selected from the pair of determined directions.

19. The method as claimed in claim 18, wherein the determining, in the one or more frequency bands of the two or more audio signals, of the first sound source direction parameter based on processing of the two or more audio signals comprises:

selecting the first sound source direction parameter from the pair of determined directions based on a further determination of a further delay which maximises a further correlation between a further pair of respective audio signals from a selected further pair of the two or more microphones.

20. The apparatus as claimed in claim 1, wherein the at least one memory stores instructions that, when executed with the at least one processor, cause the apparatus to:

generate a data stream at least based, at least partially, on:

the first sound source direction parameter;

the second sound source direction parameter; and the two or more audio signals, wherein the data stream is configured to enable generation of spatial audio.

* * * * *